(12) United States Patent
Mahmoud et al.

(10) Patent No.: US 10,479,930 B2
(45) Date of Patent: *Nov. 19, 2019

(54) ORGANIC ACID FRACTURING FLUID COMPOSITION

(71) Applicant: KING FAHD UNIVERSITY OF PETROLEUM AND MINERALS, Dhahran (SA)

(72) Inventors: Mohamed Ahmed Nasr El-Din Mahmoud, Dhahran (SA); Salah El-Din Elkatatny, Dhahran (SA); Marwan Nagm Eldeen Mohammad, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/131,913

(22) Filed: Sep. 14, 2018

(65) Prior Publication Data

US 2019/0016945 A1    Jan. 17, 2019

Related U.S. Application Data

(63) Continuation of application No. 16/034,964, filed on Jul. 13, 2018, now Pat. No. 10,119,066, which is a (Continued)

(51) Int. Cl.
*C09K 8/68* (2006.01)
*C09K 8/52* (2006.01)
(Continued)

(52) U.S. Cl.
CPC .............. *C09K 8/68* (2013.01); *C09K 8/52* (2013.01); *C09K 8/80* (2013.01); *E21B 43/267* (2013.01); *C09K 2208/12* (2013.01)

(58) Field of Classification Search
CPC ... C09K 8/68; C09K 8/52; C09K 8/80; C09K 2208/12; E21B 43/267
See application file for complete search history.

(56) References Cited

U.S. PATENT DOCUMENTS

| | | |
|---|---|---|
| 2014/0124205 A1 | 5/2014 | Nasr-El-Din |
| 2015/0107844 A1 | 4/2015 | Gupta |
| 2016/0376881 A1 | 12/2016 | Li et al. |

FOREIGN PATENT DOCUMENTS

| | | |
|---|---|---|
| WO | 2012/171857 A1 | 12/2012 |
| WO | 2014/151284 A1 | 9/2014 |

OTHER PUBLICATIONS

Lepage, J.N., et al., "An Environmentally Friendly Stimulation Fluid for High-Temperature Applications". SPE International Symposium on Oilfield Chemistry, 2 Pages total, (2009) (Abstract only).
(Continued)

*Primary Examiner* — Alicia Bland
(74) *Attorney, Agent, or Firm* — Oblon, McClelland, Maier & Neustadt, L.L.P.

(57) ABSTRACT

A fracturing fluid composition that includes a chelating agent, e.g. GLDA, and a polymeric additive comprising a copolymer of acrylamido-tert-butyl sulfonate and hydrolyzed polyacrylamide diluted in an aqueous base fluid, e.g. seawater, and a method of fracking a geological formation using the fracturing fluid composition. Various embodiments of the fracturing fluid composition and the method of fracking are also provided.

5 Claims, 8 Drawing Sheets

Related U.S. Application Data continuation of application No. 15/459,460, filed on Mar. 15, 2017, now Pat. No. 10,047,278.

(51) Int. Cl.
*C09K 8/80* (2006.01)
*E21B 43/267* (2006.01)

(56) References Cited

OTHER PUBLICATIONS

Kamal, M.S., et al., "Rheological Properties of Thermoviscosifying Polymers in High-Temperature and High-Salinity Environments", The Canadian Journal of Chemical Engineering, vol. 93, pp. 1194-1200, (2015).

ORGANIC ACID FRACTURING FLUID COMPOSITION

CROSS-REFERENCE TO RELATED APPLICATIONS

The present application is a Continuation of Ser. No. 16/034,964, now allowed, having a filing date of Jul. 13, 2018 which is a Continuation of Ser. No. 15/459,460, now U.S. Pat. No. 10,047,278, having a filing date of Mar. 15, 2017.

BACKGROUND OF THE INVENTION

Technical Field

The present invention relates to a fracturing fluid composition that includes a chelating agent and a polymeric additive diluted in an aqueous base fluid. The present invention further relates to a method of fracking a geological formation using the fracturing fluid composition.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Hydraulic fracturing is a prominent fracturing method amongst permeability-impaired formations (i.e. low permeable reservoirs, e.g., shale-gas and tight-gas with a permeability of no more than 0.5 md (milli-darcy) for oil and no more than 0.01 md for gas), because it can significantly improve the productivity and overall recovery factor of a well. Hydraulic fracturing is also used in moderate permeability reservoirs (e.g. reservoirs with a permeability of at least 50 md for oil and at least 1 md for gas) by creating a large skin around the vicinity of a wellbore and bypassing damage zones to enhance the flow of production fluids, without adversely impacting the formation.

Around 57-59% of geological formations are unconventional resources with tight gas reservoirs, that are mostly located in North America, India, China, Europe, Middle East, and North Africa [W. Assiri and J. L. Miskimins, "SPE 168160 The Water Blockage Effect on Desiccated Tight Gas Reservoir," no. February, pp. 26-28, 2014]. Any enhancement in production recovery of these tight gas reservoirs is of great importance, due to the large quantities of gas lying in these formations. Tight reservoirs are characterized by a low permeability (i.e. less than 0.5 md). Among those, are carbonate and sandstone reservoirs [W. Assiri and J. L. Miskimins, "SPE 168160 The Water Blockage Effect on Desiccated Tight Gas Reservoir," no. February, pp. 26-28, 2014; D. B. Bennion, F. B. Thomas, B. E. Schulmeister, and M. Sumani, "Determination of true effective in situ gas permeability in subnormally water-saturated tight gas reservoirs," J. Can. Pet. Technol., vol. 43, no. 10, pp. 27-32, 2004].

Water Blockage or Aqueous Phase Trapping (APT) are among the most important issues that occur in tight formations and fluid loss is a common occurrence in fracturing operations. Thus fluid loss control additives are commonly employed in the fracturing fluid composition. Loss of fracturing fluid is an extremely undesirable phenomenon as it (1) leads to poor circulation and therefore less efficient removal of cuttings, (2) requires additional cost in rig time, manpower and material to replenish the lost fluid and restore circulation and in extreme cases, (3) leads to insufficient downhole hydrostatic pressure. Remediating fluid losses effectively and quickly is still a matter of concern for many companies and operators. Over the years, numerous techniques have been developed in order to cure or to reduce low to moderate loss of fracturing fluid during fracturing operations. Under these conditions, the normal procedure is to add fluid loss agents which alone may decrease the losses while fracturing to an acceptable level. The most common method in use today for the control of lost fluid circulation is the use of sealing or plugging agents in the fracturing fluid for bridging the pores or fissures of the sub-surface formation.

A lot of research has been conducted and documented in the literature covering various fracturing fluid compositions to overcome the above mentioned issues. The fracturing fluid compositions as disclosed in the literature generally include, an oil-based fluid, a $CO_2$ energized oil-based fluid, a cross-linked water-based fluid, and a water-based foam with poly-emulsion. Furthermore, a typical fracturing fluid usually contains one or more of a cross-linked gel system, a buffer, a clay, a gel stabilizer, a biocide, a breaker, etc. to prevent damage resulting from fracturing operation. For example, in a U.S. Pat. No. 8,499,833B2, Al-Mutairi et al. developed a zero-leak emulsified acid for acid fracturing operations of carbonate reservoirs. They used emulsified acid in addition to sodium silicate in the composition of the fracturing fluid, as well as freshwater as a base fluid.

In view of the forgoing, one objective of the present invention is to provide a fracturing fluid composition that includes a chelating agent, e.g. GLDA, in combination with a polymeric additive diluted in an aqueous base fluid, e.g. seawater. The disclosed composition can operate as a cross-linker, a breaker, a fluid loss additive, a buffer, an interfacial tension reducer, and a biocide. Another objective of the present invention is to provide a method of fracking a geological formation using the fracturing fluid composition.

BRIEF SUMMARY OF THE INVENTION

According to a first aspect, the present disclosure relates to a fracturing fluid composition including i) an aqueous base fluid, ii) a chelating agent comprising glutamic diacetic acid, iii) a polymeric additive comprising a copolymer of acrylamido-tert-butyl sulfonate and hydrolyzed polyacrylamide.

In one embodiment, the polymeric additive further includes hydrolyzed polyacrylamide and/or polyacrylamido-tert-butyl sulfonate.

In one embodiment, the polymeric additive further includes one or more of xanthan, guar gum, polyacrylamide, and a copolymer of acrylamido-tert-butyl sulfonate and acrylamide.

In one embodiment, a weight percent of acrylamido-tert-butyl sulfonate in the copolymer of acrylamido-tert-butyl sulfonate and hydrolyzed polyacrylamide is in the range of 5 to 20 wt %, relative to the total weight of the copolymer.

In one embodiment, the aqueous base fluid is seawater.

In one embodiment, the chelating agent is present in the fracturing fluid composition at a concentration of no more than 30 wt %, relative to the total weight of the fracturing fluid composition.

In one embodiment, the polymeric additive is present in the fracturing fluid composition at a concentration of no more than 1 wt %, relative to the total weight of the fracturing fluid composition.

In one embodiment, the fracturing fluid composition does not include an antiscalant, a deflocculant, a crosslinker, a breaker, a fluid loss additive, a buffer, an interfacial tension reducer, and a biocide.

In one embodiment, the fracturing fluid composition has a plastic viscosity of 2 to 30 cP at a temperature of 280 to 320° F.

In one embodiment, the fracturing fluid composition has a yield point of 2 to 50 lb/100 ft$^2$ at a temperature of 280 to 320° F.

In one embodiment, the fracturing fluid composition has a gel strength of 7 to 11 lb/100 ft$^2$ at a temperature of 280 to 320° F., after 10 seconds.

In one embodiment, the fracturing fluid composition has a gel strength of 15 to 20 lb/100 ft$^2$ at a temperature of 280 to 320° F., after 10 minutes.

According to a second aspect, the present disclosure relates to a method of fracturing a subterranean formation involving injecting the fracturing fluid composition into the subterranean formation through a wellbore to fracture the subterranean formation and form fissures in the subterranean formation.

In one embodiment, the subterranean formation is a conventional reservoir, the chelating agent is present in the fracturing fluid composition at a concentration of 10 to 30 wt %, and the polymeric additive is present in the fracturing fluid composition at a concentration in the range of 0.5 to 1 wt %, each being relative to the total weight of the fracturing fluid composition.

In one embodiment, the subterranean formation is an unconventional reservoir, the chelating agent is present in the fracturing fluid composition at a concentration of 5 to 10 wt %, and the polymeric additive is present in the fracturing fluid composition at a concentration of no more than 0.5 wt %, each being relative to the total weight of the fracturing fluid composition.

In some embodiments, a % loss of the aqueous base fluid during injecting the fracturing fluid composition is no more than 1% by volume, and a permeability of the subterranean formation before and after injecting the fracturing fluid composition is substantially similar.

In some preferred embodiments, a % loss of the aqueous base fluid during injecting the fracturing fluid composition is substantially zero, and a permeability of the subterranean formation before and after injecting the fracturing fluid composition is substantially similar.

In one embodiment, the method further involves injecting a proppant into the subterranean formation through the wellbore to deposit the proppant in the fissures.

In one embodiment, the method further involves circulating the fracturing fluid composition within the wellbore for no more than 2 hours after the injecting.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
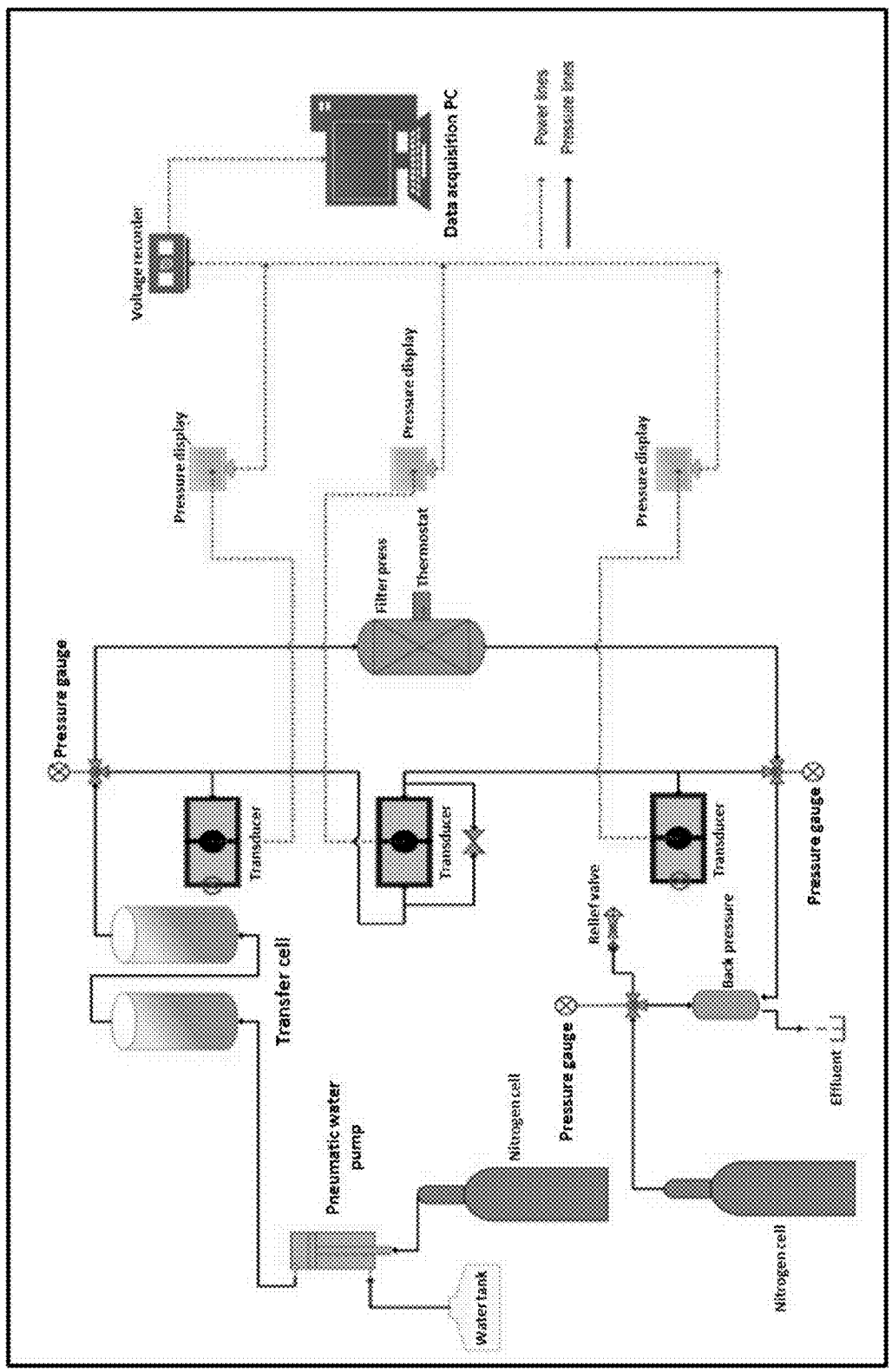
FIG. 1 represents a process flow diagram and related apparatus of a coreflooding setup for injecting a fracturing fluid into an outcrop core sample.

According to a first aspect, the present disclosure relates to a fracturing fluid composition including an aqueous base fluid.

The aqueous base fluid may refer to any water containing solution, including saltwater, hard water, and/or fresh water. For purposes of this description, the term "saltwater" will include saltwater with a chloride ion content of between about 6000 ppm and saturation, and is intended to encompass seawater and other types of saltwater including groundwater containing additional impurities typically found therein. The term "hard water" will include water having mineral concentrations between about 2000 mg/L and about 300,000 mg/L. The term "fresh water" includes water sources that contain less than 6000 ppm, preferably less than 5000 ppm, preferably less than 4000 ppm, preferably less than 3000 ppm, preferably less than 2000 ppm, preferably less than 1000 ppm, preferably less than 500 ppm of salts, minerals, or any other dissolved solids. Salts that may be present in saltwater, hard water, and/or fresh water may be, but are not limited to, cations such as sodium, magnesium, calcium, potassium, ammonium, and iron, and anions such as chloride, bicarbonate, carbonate, sulfate, sulfite, phosphate, iodide, nitrate, acetate, citrate, fluoride, and nitrite. The aqueous base fluids are ordinarily classified as saltwater fluids when they contain over 1% salt (about 6000 ppm of chloride ion). In one embodiment, the aqueous base fluid is present in at least 75 wt % relative to the total weight of the fracturing fluid composition, preferably at least 80%, preferably at least 90%, preferably at least 95%.

In the most preferred embodiment, the aqueous base fluid is seawater with a total dissolved solid in the range of 30,000 to 60,000 mg/L, preferably 35,000 to 59,000 mg/L, preferably 40,000 to 58,000 mg/L, preferably 50,000 to 57,000 mg/L, preferably about preferably 55,000 mg/L. In another embodiment, seawater has a salt concentration of at least 5,000 ppm, preferably at least 10,000 ppm, more preferably at least 30,000 ppm at a temperature in the range of 20-30° C., preferably about 25° C. Seawater may alternatively refer to water present in bays, lakes, rivers, creeks, as well as underground water resources, other than water present in oceans/seas.

The fracturing fluid composition further includes a chelating agent comprising glutamic diacetic acid. The chelating agent as used herein may stabilize a suspension solution by preventing the precipitation of at least a portion of the impurities (e.g. the dissolved solids in the aqueous base fluid). Preferably, the chelating agent may interact with at least a portion of the impurities in the suspension solution. In one embodiment, the chelating agent is treated with a base to bring a pH of the chelating agent to a value in the range of 10 to 14, preferably 11 to 13, more preferably about 12. Exemplary bases include, but are not limited to lithium hydroxide, sodium hydroxide, potassium hydroxide, ammonia, or aqueous ammonia (ammonium hydroxide), and the like. In view of that, the term "chelating agent" also includes one or more these bases in a mixed form. As a result, the fracturing fluid composition may have a pH in the range of 8 to 14, preferably 10 to 13.5, preferably 11 to 13.

In addition to glutamic diacetic acid, in another embodiment, a second chelating agent is used in the fracturing fluid composition. The second chelating agent is at least one compound selected from the group consisting of EDTA (ethylenediamine tetraacetic acid), HEDTA (hydroxyethylenediamine triacetic acid), NTA (nitriolotriacetic acid), DTPA (diethylenetriaminepentaacetic acid), MGDA (methylglycinediacetic acid), HEIDA (2-hydroxyethyliminodiacetic acid), CDTA (trans-cyclohexane-1,2-diaminetetraacetic acid), EGTA (ethylene glycol-bis(β-aminoethyl ether)-N,N,N',N'-tetraacetic acid), EDDA (ethylenediaminediacetic acid), propylene diamine tetraacetic acid (PDTA), ethylene diamine-N,N"-di(hydroxyphenylacetic) acid (EDDHA), ethylene diamine-N,N"-di-(hydroxy-methylphenyl acetic acid (EDDHMA), and salts thereof. The second chelating agent may further be in the form of a sodium, potassium, and/or ammonium salt. The second chelating agent may be present in the fracturing fluid composition at a concentration ranging from 1 to 15 wt %, preferably 5 to 10 wt %, relative to the total weight of the fracturing fluid composition. For example, in one embodiment, the fracturing fluid composition includes GLDA at a concentration of 10 to 20 wt %, preferably 10 to 15 wt %, more preferably about 10 wt %, and further includes EDTA at a concentration of 1 to 10 wt %, preferably 2 to 8 wt %, preferably 3 to 5 wt %.

The chelating agent may be present in the fracturing fluid composition at a concentration of no more than 30 wt %, preferably no more than 25 wt %, preferably no more than 20 wt %, preferably no more than 15 wt %, preferably no more than 10 wt %, relative to the total weight of the fracturing fluid composition. Further, the concentration of the chelating agent in the fracturing fluid composition is at least 1 wt %, preferably at least 3 wt %, preferably at least 5 wt %. In an alternative embodiment, the concentration of the chelating agent in the fracturing fluid composition is in the range of 1 to 30 wt %, preferably 3 to 28 wt %, preferably 5 to 25 wt %, preferably 8 to 20 wt %, preferably 10 to 18 wt %, preferably 12 to 16 wt %. The concentration of the chelating agent present in the fracturing fluid composition may vary depending on the type of the geological formation, in which the fracturing fluid composition is injected. For example, in one preferred embodiment, the geological formation is a Berea sandstone and the concentration of the chelating agent in the fracturing fluid composition is in the range of 10 to 30 wt %, preferably 12 to 25 wt %, more preferably about 20 wt %. In another preferred embodiment, the geological formation is a Scioto sandstone and the concentration of the chelating agent in the fracturing fluid composition is in the range of 1 to 10 wt %, preferably 2 to 8 wt %, more preferably about 5 wt %.

The fracturing fluid composition further includes a polymeric additive comprising a copolymer of acrylamido-tert-butyl sulfonate and hydrolyzed polyacrylamide.

The term "polymeric additive" as used herein refers to an additive of the fracturing fluid composition that includes one or more polymeric components. The polymeric additive includes a copolymer of acrylamido-tert-butyl sulfonate and hydrolyzed polyacrylamide (i.e. the compound of formula III). The term "copolymer" as used herein is not limited to the combination of two polymers, but includes any combination of polymers, e.g., terpolymers and the like. The copolymer may be a random copolymer, wherein constituent monomers of the copolymer are randomly bonded to one another; for example, in one embodiment the copolymer have a polymer structure of A-B-B-A-A-A-B-A-B-A-A-B, wherein each A represents an acrylamido-tert-butyl sulfonate unit and each B represents a hydrolyzed polyacrylamide unit. In another embodiment, the copolymer has a structure of $(A-B)_n$, wherein n ranges from 10 to 100,000, preferably from 1,000 to 50,000, preferably from 10,000 to 40,000. In a preferred embodiment, the copolymer has a structure of $[(A)_x-(B)_y]_n$, wherein each of x and y (shown in formula III) ranges from 10 to 10,000, preferably from 100 to 1,000, preferably from 500 to 1,000, and n ranges from 10 to 10,000, preferably from 100 to 5,000, preferably from 500 to 1,000.

The copolymer of acrylamido-tert-butyl sulfonate and hydrolyzed polyacrylamide (i.e. the compounds of formula III) may alternatively be referred to as a "thermo-viscosifying polymer", in this disclosure.

In one embodiment, a weight percent of acrylamido-tert-butyl sulfonate in the thermo-viscosifying polymer (i.e. the weight percent of x in formula III) is in the range of 5 to 20 wt %, preferably 6 to 15 wt %, preferably 7 to 10 wt %, preferably about 8 wt %, relative to the total weight of the copolymer. Furthermore, a weight percent of hydrolyzed polyacrylamide in the thermo-viscosifying polymer (i.e. the weight percent of y in formula III) is within the range of 75 to 95 wt %, preferably 80 to 92 wt %, more preferably about 85 to 90 wt %. In one embodiment, the thermo-viscosifying polymer has a weight average molecular weight ($M_w$) in the range of from about 100,000 Da (Dalton) to about 50 million Da, preferably about 500,000 Da to about 20 million Da, preferably about 1 million Da to about 10 million Da, preferably about 8 million Da.

Although acrylamido-tert-butyl sulfonate is preferred in the structure of the thermo-viscosifying polymer, other sulfonate-containing compounds may also be used in the composition of the copolymer. Exemplary sulfonate-containing compounds include, but are not limited to acrylamido-methyl sulfonate, acrylamido-ethyl sulfonate, acrylamido-propyl sulfonate, etc. In one embodiment, the sulfonate-containing compounds is an acrylamido-alkyl sulfonate, wherein the alkyl is a hydrocarbon with a general chemical $C_nH_{2n+1}$, with n being a value in the range of 1 to 20, preferably 2 to 10, preferably 3 to 8. The thermo-viscosifying polymer may be formed via a two-step process, wherein a partially hydrolyzed polyacrylamide is formed, and then the partially hydrolyzed polyacrylamide is polymerized with acrylamido-tert-butyl sulfonate.

The thermo-viscosifying polymer is a hydrophilic graft copolymer or a hydrophilic block copolymer with a "graft" or a "block" polymer chains that provide water miscibility of the thermo-viscosifying polymer at room temperature. At elevated temperatures, said graft or block polymer chains becomes less miscible in water (i.e. the aqueous base fluid) and self-aggregate, thus forming physically entangled polymer networks within a fluid that contains the thermo-viscosifying polymer, which results an increase in a viscosity of the fluid. This phenomenon may be referred to as a "thermo-thickening behavior" of the thermo-viscosifying polymer.

Yet, in a preferred embodiment, the polymeric additive further includes hydrolyzed polyacrylamide (i.e. the compounds of formula I and I') and/or polyacrylamido-tert-butyl sulfonate (i.e. the compound of formula II).

The term "hydrolyzed polyacrylamide" as used herein refers to both fully hydrolyzed polyacrylamide (as shown in formula I) and partially hydrolyzed polyacrylamide (as shown in formula I'). The term "fully hydrolyzed polyacrylamide" as used herein refers to a polyacrylamide, wherein all the amide groups present in the polyacrylamide are hydrolyzed to form carboxylate groups (as shown in formula I). Fully hydrolyzed polyacrylamide may also be referred to as "polyacrylate", and therefore, these terms are interchangeable in this disclosure. In one embodiment, the fully hydrolyzed polyacrylamide has a structure as shown in formula I, wherein q ranges from 10 to 100,000, preferably from 1,000 to 50,000, preferably from 10,000 to 40,000.

Furthermore, the term "partially hydrolyzed polyacrylamide" as used herein refers to a polyacrylamide, wherein some of the amide groups present in the polyacrylamide are hydrolyzed to carboxylate groups (as shown in formula I'). In one embodiment, a molar ratio of amide groups to that of carboxylate groups in a partially hydrolyzed polyacrylamide ranges from 0.1 to 10, preferably 0.2 to 9, preferably 0.3 to 8, preferably 0.4 to 7, preferably 0.5 to 6, preferably 0.6 to 5, preferably 0.7 to 4, preferably 0.8 to 3, preferably 0.9 to 2, preferably about 1. The partially hydrolyzed polyacrylamide may have a random copolymer with a structure of A-B-B-A-A-A-B-A-B-B-A-A-B, or a diblock copolymer with a structure of $[(A)_j-(B)_k]_n$, wherein each of j and k (shown in formula I') ranges from 10 to 10,000, preferably from 100 to 1,000, preferably from 500 to 1,000, and n ranges from 10 to 10,000, preferably from 100 to 5,000, preferably from 500 to 1,000. A molar ratio of amide groups to that of carboxylate groups in a partially hydrolyzed polyacrylamide may be determined via FTIR spectroscopy, chromatography, or titration.

In another embodiment, the polymeric additive includes polyacrylamido-tert-butyl sulfonate (i.e. the compound of formula II), wherein p ranges from 10 to 100,000, preferably from 1,000 to 50,000, preferably from 10,000 to 40,000.

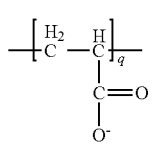

(I)

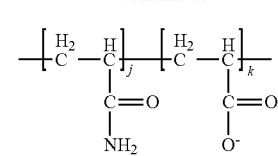

(I')

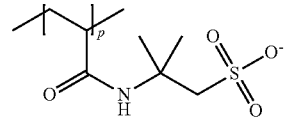

(II)

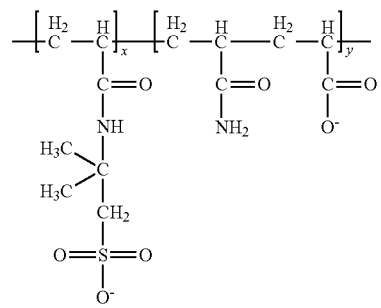

(III)

In one embodiment, the polymeric additive further includes a homo-polymer, a copolymer, or a terpolymer of acrylamide, acrylic acid, vinyl sulfonate, allyl vinyl sulfonate, maleic anhydride, tumeric acid, diallyl dimethyl ammonium chloride (DADMAC), vinyl benzyl chloride, vinyl benzyl boronate, vinyl imidazole, vinyl trialkyl silane, 4-acetocystyrene, 9-vinyl anthracene, sodium styrene sulphonate, (3-acrylamidopropyl) trimethylammonium chloride solution (APTAC), 3-methacrylamido-N,N,N-trimethlpropane-1-aminium chloride (MAPTAC), 2-dimethylaminoethyl acrylate (ADAME), N,N, dimethylaminoethyl methacrylate (MADAME); or a combination thereof. The polymeric additive may further include xanthan and/or guar gum.

In one embodiment, the polymeric additive is present in the fracturing fluid composition at a concentration of no more than 1 wt %, preferably no more than 0.9 wt %, preferably no more than 0.8 wt %, preferably no more than 0.7 wt %, preferably no more than 0.6 wt %, preferably no more than 0.5 wt %, preferably no more than 0.4 wt %, preferably no more than 0.3 wt %, preferably no more than 0.2 wt %, preferably no more than 0.1 wt %, relative to the total weight of the fracturing fluid composition. The concentration of the polymeric additive present in the fracturing fluid composition may vary depending on the type of the geological formation, in which the fracturing fluid composition is injected. For example, in one preferred embodiment, the geological formation is a Berea sandstone and the concentration of the polymeric additive in the fracturing fluid composition is in the range of 0.1 to 1 wt %, preferably 0.5 to 1 wt %, preferably 0.8 to 1 wt %, more preferably about 1 wt %. In another preferred embodiment, the geological formation is a Scioto sandstone and the concentration of the polymeric additive in the fracturing fluid composition is in the range of 0.1 to 0.5 wt %, preferably 0.2 to 0.5 wt %, more preferably about 0.5 wt %. In one embodiment, the polymeric additive is present in sufficient amount in the fracturing fluid composition, so the polymeric additive operates as both a friction reducing polymer and a viscosifier.

In another embodiment, the polymeric additive further includes a surfactant. The surfactant can be any surfactant known in the art and can be cationic, anionic, and/or nonionic. Preferably, the surfactant is nonionic and/or anionic. Even more preferably, the surfactant is anionic. The nonionic surfactant of the present composition is preferably selected from the group consisting of alkanolamides, alkoxylated alcohols, alkoxylated amines, amine oxides, alkoxylated amides, alkoxylated fatty acids, alkoxylated fatty amines, alkoxylated alkyl amines (e.g., cocoalkyl amine ethoxylate), alkyl phenyl polyethoxylates, lecithin, hydroxylated lecithin, fatty acid esters, glycerol esters and their ethoxylates, glycol esters and their ethoxylates, esters of propylene glycol, sorbitan, ethoxylated sorbitan, polyglycosides and the like, and mixtures thereof. Alkoxylated alcohols, preferably ethoxylated alcohols, optionally in combination with (alkyl) polyglycosides, are preferred over other nonionic surfactants. Exemplary anionic surfactants may include, but are not limited to sulfonates, hydrolyzed keratin, sulfosuccinates, taurates, betaines, modified betaines, alkylamidobetaines (e.g., cocoamidopropyl betaine). The surfactant may be used in a liquid or a powder form, wherein the surfactant may be present in the polymeric additive in a sufficient amount to prevent immiscibility with the fracturing fluid composition at the operating temperature. In an embodiment where liquid surfactants are used, the surfactants are generally present in an amount in the range of from about 0.01 vol % to about 5.0 vol %, preferably from about 0.05 vol % to about 2.0 vol %, more preferably 0.1 to 1 vol %, with each volume percentile being relative to the total volume of the fracturing fluid composition. In embodiments where powdered surfactants are used, the surfactants may be present in an amount in the range of from about 0.001 wt % to 0.5 wt %, preferably 0.01 wt % to 0.4 wt %, relative to the total weight of the fracturing fluid composition.

In a preferred embodiment, the polymeric additive in combination with the chelating agent separately operates as a crosslinker, a breaker, a fluid loss additive, a buffer, an interfacial tension reducer, a biocide, a viscosifier, an antiscalant, and a deflocculant. As a result, the fracturing fluid composition may not include any of the above additives. Below is a list of compounds that can be excluded from the fracturing fluid composition without adversely affecting its stability or other properties.

The term "crosslinker" as used herein refers to an additive of the fracturing fluid composition, e.g. a metallic salt, which reacts with multiple-strand polymer to couple the molecules, creating a fluid of high, but closely controlled, viscosity. Exemplary crosslinkers that may be excluded from the fracturing fluid composition include but not limited to, salts of Al, Fe, B, Ti, Cr, and Zr, or organic crosslinkers such as polyethylene amides and formaldehyde.

The term "breaker" as used herein refers to an additive of the fracturing fluid composition that provides a desired viscosity reduction at a desired time. Examples of such breakers that may be excluded from the fracturing fluid composition include but not limited to, oxidizing agents such as triethanol amine, sodium chlorites, sodium bromate, hypochlorites, perborate, persulfates, and peroxides, as well as enzymes that may be effective in breaking.

The term "fluid loss additive" as used herein refers to an additive of the fracturing fluid composition that controls loss of the fracturing fluid when injected into a geological formation. Exemplary fluid loss additives that may be excluded from the fracturing fluid composition include but not limited to, starch, carboxymethyl cellulose, polysaccharides, silica flour, gas bubbles (energized fluid or foam), benzoic acid, soaps, resin particulates, relative permeability modifiers, degradable gel particulates, diesel or other hydrocarbons dispersed in fluid, and other immiscible fluids.

The term "buffer" as used herein refers to an additive of the fracturing fluid composition that is used to buffer or to adjust the pH of the fracturing fluid composition. Exemplary buffers that may be excluded from the fracturing fluid composition include but not limited to, monosodium phosphate, disodium phosphate, sodium tripolyphosphate, and the like.

The term "biocide" as used herein refers to an additive of the fracturing fluid composition that that kills bacteria. Exemplary biocides that may be excluded from the fracturing fluid composition include but not limited to, phenoxyethanol, ethylhexyl glycerine, benzyl alcohol, methyl chloroisothiazolinone, methyl isothiazolinone, methyl paraben, ethyl paraben, propylene glycol, bronopol, benzoic acid, imidazolinidyl urea, a 2,2-dibromo-3-nitrilopropionamide, and a 2-bromo-2-nitro-1,3-propane diol.

The term "viscosifiers" as used herein refers to an additive of the fracturing fluid composition that increases a viscosity of the fracturing fluid. Exemplary viscosifiers that may be excluded from the fracturing fluid composition include but not limited to, natural polymers and derivatives such as hydroxyethyl cellulose (HEC), carboxymethylcellulose, polyanionic cellulose (PAC), or synthetic polymers and oligomers such as poly(diallyl amine), diallyl ketone, diallyl amine, styryl sulfonate, vinyl lactam, laponite, polygorskites (e.g. attapulgite, sepiolite), and mixtures thereof.

The term "antiscalant" as used herein refers to an additive of the fracturing fluid composition that prevents, slows, minimizes, and/or stops the precipitation of scale. Exemplary antiscalants that may be excluded from the fracturing fluid composition include but not limited to, phosphine or sodium hexametaphosphate, sodium tripolyphosphate and other inorganic polyphosphates, hydroxy ethylidene diphosphonic acid, butane-tricarboxylic acid, phosphonates, itaconic acid, 3-allyloxy-2-hydroxy-propionic acid, and the like.

The term "deflocculant" as used herein refers to an additive of the fracturing fluid composition that prevents a colloid from coming out of suspension or to thin suspensions or slurries, and may be used to reduce viscosity of clay-based fluids. Exemplary deflocculants that may be excluded from the fracturing fluid composition include but not limited to, an anionic polyelectrolyte, such as acrylates, polyphosphates, lignosulfonates (Lig), or tannic acid derivates such as Quebracho.

American Petroleum Institute (APT) specifications of the fracturing fluid compositions, which include the aqueous base fluid, the chelating agent, and the polymeric additive, determined using a Fann viscometer (or a V-G meter). The fracturing fluid compositions are prepared after mixing the fracturing fluid compositions for 20 minutes, overnight aging, and stirring for 25 an additional five minutes. The Fann meter is used to determine standard drilling fluid parameters as follows:

Plastic viscosity (PV, cp)=600 dial (i.e. rpm reading)−300 dial

Yield point (YP, lb/100 ft$^2$)=300 dial−plastic viscosity

Gel Strength (GS, lb/100 ft$^2$) is measured by taking a 3 rpm reading, allowing the fracturing fluid composition to set for 10 seconds or for 10 minutes or for 30 minutes. A difference in these readings between about 1 and 8 is preferred.

It should be recognized that the above parameters are interrelated, and once an acceptable plastic viscosity has been obtained, the other values may be adjusted by adjusting the proportions of the aqueous base fluid, the chelating agent, and the polymeric additive.

In one embodiment, the fracturing fluid composition has a plastic viscosity of 2 to 30 cP, preferably 2 to 20 cP, preferably 2 to 15 cP, at a temperature of 280 to 320° F., preferably 290 to 310° F., preferably about 300° F. In a preferred embodiment, a concentration of the chelating agent in the fracturing fluid composition is in the range of 15 wt % to 25 wt %, preferably about 20 wt %, and the polymer additive is hydrolyzed polyacrylamide (i.e. the compound of formula I and/or I') with a concentration in the range of 0.1 to 0.5 wt %, preferably 0.2 to 0.5 wt %, more preferably about 0.5 wt %, wherein the fracturing fluid composition has a plastic viscosity of 2 to 10 cP, preferably 2 to 5 cP, preferably about 3 cP, at a temperature of 280 to 320° F., preferably 290 to 310° F., preferably about 300° F. In another preferred embodiment, a concentration of the chelating agent in the fracturing fluid composition is in the range of 15 wt % to 25 wt %, preferably about 20 wt %, and the polymer additive is polyacrylamido-tert-butyl sulfonate (i.e. the compound of formula II), with a concentration in the range of 0.1 to 0.5 wt %, preferably 0.2 to 0.5 wt %, more preferably about 0.5 wt %, wherein the fracturing fluid composition has a plastic viscosity of 5 to 10 cP, preferably 6 to 8 cP, preferably about 7 cP, at a temperature of 280 to 320° F., preferably 290 to 310° F., preferably about 300° F. In another preferred embodiment, a concentration of the chelating agent in the fracturing fluid composition is in the range of 15 wt % to 25 wt %, preferably about 20 wt %, and the polymer additive is the thermo-viscosifying polymer (i.e. the compound of formula III) with a concentration in the range of 0.1 to 0.5 wt %, preferably 0.2 to 0.5 wt %, more preferably about 0.5 wt %, wherein the fracturing fluid composition has a plastic viscosity of 2 to 6 cP, preferably 2 to 4 cP, preferably about 2 cP, at a temperature of 280 to 320° F., preferably 290 to 310° F., preferably about 300° F. In another preferred embodiment, a concentration of the chelating agent in the fracturing fluid composition is in the range of 15 wt % to 25 wt %, preferably about 20 wt %, and the polymer additive is hydrolyzed polyacrylamide (i.e. the compound of formula I and/or I') with a concentration in the range of 0.5 to 1 wt %, preferably 0.8 to 1 wt %, more preferably about 1 wt %, wherein the fracturing fluid composition has a plastic viscosity of 5 to 15 cP, preferably 10 to 15 cP, preferably about 13 cP, at a temperature of 280 to 320° F., preferably 290 to 310° F., preferably about 300° F. In another preferred embodiment, a concentration of the chelating agent in the fracturing fluid composition is in the range of 15 wt % to 25 wt %, preferably about 20 wt %, and the polymer additive is polyacrylamido-tert-butyl sulfonate (i.e. the compound of formula II), with a concentration in the range of 0.5 to 1 wt %, preferably 0.8 to 1 wt %, more preferably about 1 wt %, wherein the fracturing fluid composition has a plastic viscosity of 20 to 30 cP, preferably 25 to 30 cP, preferably about 29 cP, at a temperature of 280 to 320° F., preferably 290 to 310° F., preferably about 300° F. In another preferred embodiment, a concentration of the chelating agent in the fracturing fluid composition is in the range of 15 wt % to 25 wt %, preferably about 20 wt %, and the polymer additive is the thermo-viscosifying polymer (i.e. the compound of formula III) with a concentration in the range of 0.5 to 1 wt %, preferably 0.8 to 1 wt %, more preferably about 1 wt %, wherein the fracturing fluid composition has a plastic viscosity of 5 to 15 cP, preferably 6 to 10 cP, preferably about 8 cP, at a temperature of 280 to 320° F., preferably 290 to 310° F., preferably about 300° F.

In one embodiment, the fracturing fluid composition has a yield point of 2 to 50 lb/100 ft$^2$, preferably 2 to 30 lb/100 ft$^2$, preferably 2 to 20 lb/100 ft$^2$ at a temperature of 280 to 320° F., preferably 290 to 310° F., preferably about 300° F. In a preferred embodiment, a concentration of the chelating agent in the fracturing fluid composition is in the range of 15 wt % to 25 wt %, preferably about 20 wt %, and the polymer additive is hydrolyzed polyacrylamide (i.e. the compound of formula I and/or I') with a concentration in the range of 0.1 to 0.5 wt %, preferably 0.2 to 0.5 wt %, more preferably about 0.5 wt %, wherein the fracturing fluid composition has a yield point of 2 to 10 lb/100 ft$^2$, preferably 2 to 5 lb/100 ft$^2$, preferably about 4 lb/100 ft$^2$, at a temperature of 280 to 320° F., preferably 290 to 310° F., preferably about 300° F. In another preferred embodiment, a concentration of the chelating agent in the fracturing fluid composition is in the range of 15 wt % to 25 wt %, preferably about 20 wt %, and the polymer additive is polyacrylamido-tert-butyl sulfonate (i.e. the compound of formula II), with a concentration in the range of 0.1 to 0.5 wt %, preferably 0.2 to 0.5 wt %, more preferably about 0.5 wt %, wherein the fracturing fluid composition has a yield point of 5 to 10 lb/100 ft$^2$, preferably 5 to 8 lb/100 ft$^2$, preferably about 6 lb/100 ft$^2$, at a temperature of 280 to 320° F., preferably 290 to 310° F., preferably about 300° F. In another preferred embodiment, a concentration of the chelating agent in the fracturing fluid composition is in the range of 15 wt % to 25 wt %, preferably about 20 wt %, and the polymer additive is the thermo-viscosifying polymer (i.e. the compound of formula III) with a concentration in the range of 0.1 to 0.5 wt %, preferably 0.2 to 0.5 wt %, more preferably about 0.5 wt %, wherein the fracturing fluid composition has a yield point of 2 to 6 lb/100 ft$^2$, preferably 2 to 4 lb/100 ft$^2$, preferably about 2 lb/100 ft$^2$, at a temperature of 280 to 320° F., preferably 290 to 310° F., preferably about 300° F. In another preferred embodiment, a concentration of the chelating agent in the fracturing fluid composition is in the range of 15 wt % to 25 wt %, preferably about 20 wt %, and the polymer additive is hydrolyzed polyacrylamide (i.e. the compound of formula I and/or I') with a concentration in the range of 0.5 to 1 wt %, preferably 0.8 to 1 wt %, more preferably about 1 wt %, wherein the fracturing fluid composition has a yield point of 5 to 25 lb/100 ft$^2$, preferably 15 to 25 lb/100 ft$^2$, preferably about 19 lb/100 ft$^2$, at a temperature of 280 to 320° F., preferably 290 to 310° F., preferably about 300° F. In another preferred embodiment, a concentration of the chelating agent in the fracturing fluid composition is in the range of 15 wt % to 25 wt %, preferably about 20 wt %, and the polymer additive is polyacrylamido-tert-butyl sulfonate (i.e. the compound of formula II), with a concentration in the range of 0.5 to 1 wt %, preferably 0.8 to 1 wt %, more preferably about 1 wt %, wherein the fracturing fluid composition has a yield point of 30 to 55 lb/100 ft$^2$, preferably 40 to 50 lb/100 ft$^2$, preferably about 44 lb/100 ft$^2$, at a temperature of 280 to 320° F., preferably 290 to 310° F., preferably about 300° F. In another preferred embodiment, a concentration of the chelating agent in the fracturing fluid composition is in the range of 15 wt % to 25 wt %, preferably about 20 wt %, and the polymer additive is the thermo-viscosifying polymer (i.e. the compound of formula III) with a concentration in the range of 0.5 to 1 wt %, preferably 0.8 to 1 wt %, more preferably about 1 wt %, wherein the fracturing fluid composition has a yield point of 5 to 15 lb/100 ft$^2$, preferably 8 to 12 lb/100 ft$^2$, preferably about 9 lb/100 ft², at a temperature of 280 to 320° F., preferably 290 to 310° F., preferably about 300° F.

Yet, in another preferred embodiment, a concentration of the chelating agent in the fracturing fluid composition is in the range of 15 wt % to 25 wt %, preferably about 20 wt %, wherein the fracturing fluid composition has a gel strength of 5 to 15 lb/100 ft², preferably 6 to 14 lb/100 ft², preferably 7 to 13 lb/100 ft², preferably 7 to 12 lb/100 ft², preferably 7 to 11 lb/100 ft², at a temperature of 280 to 320° F., preferably 290 to 310° F., preferably about 300° F., after 10 seconds. In addition, in another embodiment, a concentration of the chelating agent in the fracturing fluid composition is in the range of 15 wt % to 25 wt %, preferably about 20 wt %, wherein the fracturing fluid composition has a gel strength of 15 to 25 lb/100 ft², preferably 15 to 24 lb/100 ft², preferably 15 to 22 lb/100 ft², preferably 15 to 20 lb/100 ft², preferably 15 to 19 lb/100 ft², at a temperature of 280 to 320° F., preferably 290 to 310° F., preferably about 300° F., after 10 minutes.

The fracturing fluid can preferably be used at any temperature ranging from 35 to 400° F. (about 2 and 204° C.). More preferably, the fracturing fluid may be used at a temperature ranging from 77 to 300° F. (about 25 and 149° C.).

At the same time the fracturing fluid composition can be used at an increased pressure. Often fluids are pumped into the formation under pressure. The pressure used may be below a fracture pressure, i.e. the pressure at which a specific formation is susceptible to fracture, or above the fracture pressure. Fracture pressure can vary a lot depending on the type of a geological formation, but is well known by the person skilled in the art.

In one embodiment, the fracturing fluid composition operates as a treatment fluid. The term "treatment" in this application is intended to cover any treatment of the formation with the fracturing fluid composition, and specifically covers treating a geological formation with the fluid to achieve at least one of (i) an increased permeability by at least partial dissolution of the formation, (ii) the removal of small particles, and (iii) the removal of inorganic scale, to enhance the well performance and enable an increased production of oil and/or gas from the formation. At the same time, the fracturing fluid composition may cover cleaning of the wellbore and descaling of the oil/gas production well and production equipment.

In another embodiment, the fracturing fluid composition limits swelling of clays in a geological formation.

According to a second aspect, the present disclosure relates to a method of fracturing or fracking a subterranean formation. The method involves injecting the fracturing fluid composition into the subterranean formation through a wellbore to fracture the subterranean formation and form fissures in the subterranean formation. In one embodiment, the fracturing fluid composition is injected at a pressure of at least 1,000 psi, at least 2,000 psi, at least 3,000 psi, at least 4,000 psi, at least 5,000 psi, at least 5,500 psi, at least 6,000 psi, at least 6,500 psi, at least 7,000 psi, but no more than 10,000 psi to fracture the subterranean formation and form fissures in the subterranean formation.

"Fracturing" or "fracking" as used herein refers to the process of initiating and subsequently propagating a fracture of the rock layer by employing the pressure of a fluid as the source of energy. In some embodiments, fracking is accomplished by pumping in liquids at high pressure. A hydraulic fracture may be formed by pumping a fracturing fluid (i.e. the fracturing fluid composition, in one or more of its embodiments) into the wellbore at a rate sufficient to increase the pressure downhole to a value in excess of a critical fracture pressure associated with the formation rock. The pressure causes the formation to crack, allowing the fracturing fluid to enter and extend the crack farther into the formation. Following fracking by high pressures, the fractured formation allows more hydrocarbons (e.g., methane, condensate, ethane, oil) and/or water to be extracted since the formation walls are more porous. Fracking can be done in vertical wells, slanted wells, and in horizontally drilled wells. In addition, fracking may be performed on conventional or unconventional reservoirs. As used herein, the term "conventional reservoir" may refer to a reservoir in which buoyant forces keep hydrocarbons in place below a sealing caprock. The formation and fluid characteristics of conventional reservoirs typically permit oil or natural gas to flow readily into the wellbores. An example of a conventional reservoir is Berea sandstone, whose composition is shown in Table 3. In contrast, an "unconventional reservoir" may refer to a reservoir in which gas might be distributed throughout the reservoir at the basin scale, and in which buoyant forces or the influence of a water column on the location of hydrocarbons within the reservoir are not sufficient to create a readily flow of oil or natural gas into the wellbores. An example of an unconventional reservoir is Scioto sandstone, whose composition is also shown in Table 3.

As used herein, a "wellbore" includes any geological structure or formation, that may contain various combinations of natural gas (i.e., primarily methane), light hydrocarbon or non-hydrocarbon gases (including condensable and non-condensable gases), light hydrocarbon liquids, heavy hydrocarbon liquids, crude oil, rock, oil shale, bitumen, oil sands, tar, coal, and/or water. Exemplary non-condensable gases include hydrogen, carbon monoxide, carbon dioxide, methane, and other light hydrocarbons.

In one embodiment, the pH of the fracturing fluid composition may be adjusted depending on the fracturing application or problems that may be encountered during a fracturing operation. For example, the pH of the fracturing fluid composition may be adjusted so as to provide for preferable solubility of the various organic components in the dispersion (e.g. the polymeric additive, the chelating agent, and optionally a surfactant) and is preferably between about 10 and 14, preferably between about 11 and 13, more preferably about 12. This pH range may also be advantageously suited for fracturing operations where acid promoted damage/corrosion to equipment, such as metal equipment is a concern.

In a preferred embodiment, the subterranean formation is a conventional reservoir (e.g. the Berea sandstone), the chelating agent is present in the fracturing fluid composition at a concentration of 10 to 20 wt %, preferably 10 to 18 wt %, preferably 10 to 15 wt %, preferably 10 to 12 wt %, preferably about 10 wt %, and the polymeric additive is present in the fracturing fluid composition at a concentration in the range of 0.5 to 1 wt %, preferably 0.8 to 1 wt %, more preferably about 1 wt %, each being relative to the total weight of the fracturing fluid composition. Accordingly, the polymeric additive is hydrolyzed polyacrylamide (i.e. the compounds of formula I and I'), polyacrylamido-tert-butyl sulfonate (i.e. the compound of formula II), and/or the thermo-voscosifying polymer (i.e. the compound of formula III). In another preferred embodiment, the subterranean formation is an unconventional reservoir (e.g. the Scioto sandstone), the chelating agent is present in the fracturing fluid composition at a concentration of 5 to 10 wt %, preferably 5 to 8 wt %, preferably 5 to 7 wt %, preferably 5 to 6 wt %, preferably about 5 wt %, and the polymeric additive is present in the fracturing fluid composition at a concentration in the range of 0.1 to 0.5 wt %, preferably 0.2 to 0.5 wt %, more preferably about 0.5 wt %, each being relative to the total weight of the fracturing fluid composition. Accordingly, the polymeric additive is hydrolyzed polyacrylamide (i.e. the compounds of formula I and I'), polyacrylamido-tert-butyl sulfonate (i.e. the compound of formula II), and/or the thermo-voscosifying polymer (i.e. the compound of formula III).

In one embodiment, the subterranean formation is a conventional reservoir (e.g. the Berea sandstone), a surfactant (as described previously) is present in the fracturing fluid composition at a concentration in the range of 0.001 wt % to 0.5 wt %, preferably 0.01 wt % to 0.4 wt %, relative to the total weight of the fracturing fluid composition. In another embodiment, the subterranean formation is an unconventional reservoir (e.g. the Scioto sandstone), and a surfactant is not used in the fracturing fluid composition.

In one embodiment, a % loss of the aqueous base fluid during injecting the fracturing fluid composition is no more than 1 vol %, preferably no more than 0.5 vol %, preferably no more than 0.1 vol %, preferably no more than 0.05 vol %, preferably no more than 0.01 vol %. Accordingly, a permeability of the subterranean formation before and after injecting the fracturing fluid composition is substantially similar. However, in a preferred embodiment, a % loss of the aqueous base fluid during injecting the fracturing fluid composition is substantially zero. Accordingly, a permeability of the subterranean formation before and after injecting the fracturing fluid composition is substantially similar. In view of that, in one embodiment, the subterranean formation is a conventional reservoir (e.g. the Berea sandstone), and a permeability of the subterranean formation before and after injecting the fracturing fluid composition is substantially similar in the range of 120 to 180 md (mili darcy), preferably 130 to 170 md, more preferably 140 to 160 md, even more preferably about 150 md. In another embodiment, the subterranean formation is an unconventional reservoir (e.g. the Scioto sandstone), and a permeability of the subterranean formation before and after injecting the fracturing fluid composition is substantially similar in the range of 1 to 10 md (mili darcy), preferably 1 to 5 md, more preferably 2 to 4 md, even more preferably about 3.2 md.

The term "percent loss" as used herein refers to a volume percentile of a leaked aqueous base fluid relative to the total volume of the fracturing fluid composition. Preferably, the polymeric additive in combination with the chelating agent operates as a fluid loss additive in the fracturing fluid composition, and therefore % loss of the aqueous base fluid during injecting the fracturing fluid composition is preferably zero, without adding any fluid loss additive to the fracturing fluid composition.

In one embodiment, the method further involves injecting a proppant into the subterranean formation through the wellbore to deposit the proppant in the fissures and to maintain the structural integrity of the wellbore. A "proppant" as used herein refers to any granular material that, in an aqueous mixture, can be used to fracture the rock formation and to provide structural support to the wellbore and/or fissures that develop in the rock formation due to pressurizing the rock formation during fracking. In one embodiment, the proppant is grains of sand, ceramic, silica, quartz, or other particulates that prevent the fractures from closing when the injection is stopped. Alternatively, any particulates that are commonly used in fracturing operations may be used in the present invention, for example, gravel, bauxite, glass materials, wood, plant and vegetable matter, nut hulls, walnut hulls, cotton seed hulls, cement, fly ash, fibrous materials, composite particulates, hollow spheres and/or porous proppant. It should be understood that the term "particulate" as used in this disclosure includes all known shapes of materials including substantially spherical materials, oblong, fibre-like, ellipsoid, rod-like, polygonal materials (such as cubic materials), mixtures thereof, derivatives thereof, and the like.

In one embodiment, the method further involves circulating the fracturing fluid composition within the wellbore for no more than 2 hours, preferably no more than 1 hour, more preferably no more than 30 minutes, after the injecting.

The examples below are intended to further illustrate protocols for the fracturing fluid composition and the method of fracturing a subterranean formation using thereof, and are not intended to limit the scope of the claims.

Example 1

Both rheology and coreflooding experiments were conducted to evaluate a developed fracturing fluid system. Seawater (Gulf seawater) with a composition as shown in Table 1 was used to prepare the fracturing fluid as a base. GLDA chelating agent with a pH of 12 was used at two different concentrations; 5 wt % for the unconventional reservoir fracturing and 10 wt % for the conventional reservoir fracturing. The polymer concentration in both cases was 0.45 wt %, relative to the total weight of the fluid. HPHT viscometer was used to measure the viscosity and coreflooding was used to assess the effect on permeability and fluid loss. FIG. 1 shows the flooding set-up used to evaluate the developed systems on actual outcrop core samples for unconventional and conventional reservoirs; one with high permeability and the other one with low permeability. Table 2 shows the different polymers tested with the GLDA in this work along with their stable range of temperature. In addition, Table 3 shows the minerals compositions of the two cores used.

TABLE 1

Seawater Composition

| Ions | Seawater (mg/L) |
|---|---|
| Sodium | 18300 |
| Calcium | 650 |
| Magnesium | 2110 |
| Sulfate | 4290 |
| Chloride | 32200 |
| Carbonate | 0 |
| Bicarbonate | 120 |
| TDS | 57670 |

TABLE 2

Polymers used with The GLDA in this study

| # | Polymer Type | Temperature (° F.) | Pressure (psia) | Shear Rate ($s^{-1}$) | pH | Running Time (Hrs) |
|---|---|---|---|---|---|---|
| 1 | Co-Polymer | 300 | 300 | 511 | 12 | 12 |
| 2 | HPAM | 300 | 300 | 511 | 12 | 12 |
| 3 | Xanthan | 300 | 300 | 511 | 12 | 12 |
| 4 | Guar Gum | 300 | 300 | 511 | 12 | 12 |
| 5 | TVP | 300 | 300 | 511 | 12 | 12 |

TABLE 3

Mineral Composition

| Mineral | Berea SS (Conventional) | Scioto SS (Unconventional) |
| --- | --- | --- |
| Quartz | 87 | 71 |
| Dolomite | 1 | — |
| Calcite | 2 | — |
| Kaolinite | 4 | Trace |
| Illite | 1 | 18 |
| Chlorite | 2 | 4 |
| Potassium-Feldspar | 3 | 2 |
| Plagioclase | — | 5 |

Example 2

Figure 2:
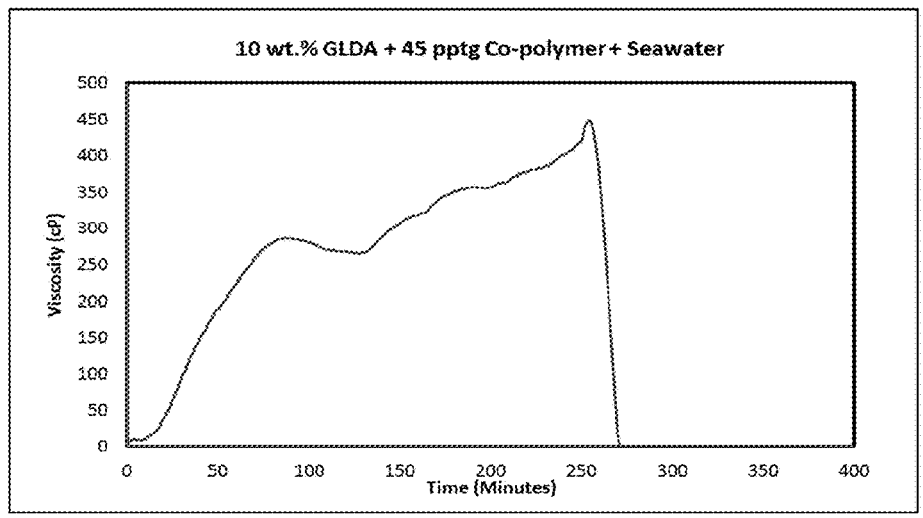
FIG. 2 represents a graph of viscosity versus time for a fracturing fluid composition having 10 wt % GLDA and 1 wt % polymeric additive (or about 45 pounds per thousand gallons, pptg) at a temperature of 300° F., a pressure of 300 psi, and a shear rate of 511 s$^{-1}$.
Figure 3:
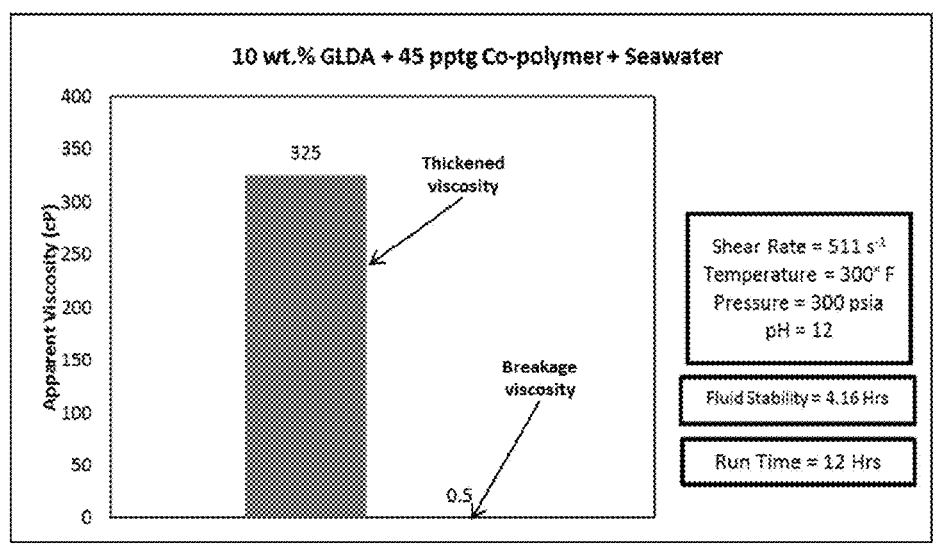
FIG. 3 represents an apparent thickened and breakage viscosity of a fracturing fluid composition having 10 wt % GLDA and 1 wt % polymeric additive (or about 45 pounds per thousand gallons, pptg) at a temperature of 300° F., a pressure of 300 psi, and a shear rate of 511 s$^{-1}$.

FIG. 2 and FIG. 3 show viscosity measurements of a fracturing fluid composition that includes 10 wt % GLDA and 45 pptg co-polymer diluted in seawater at 300° F. and 300 psi. The viscosity increased to an average value of 350 lb/100 ft² and remained stable for more than 4 hours and then declined to 0.5. As a result, this fluid composition can be used for high permeability or conventional reservoirs. The pH of the fluid was about 12.

Figure 4:
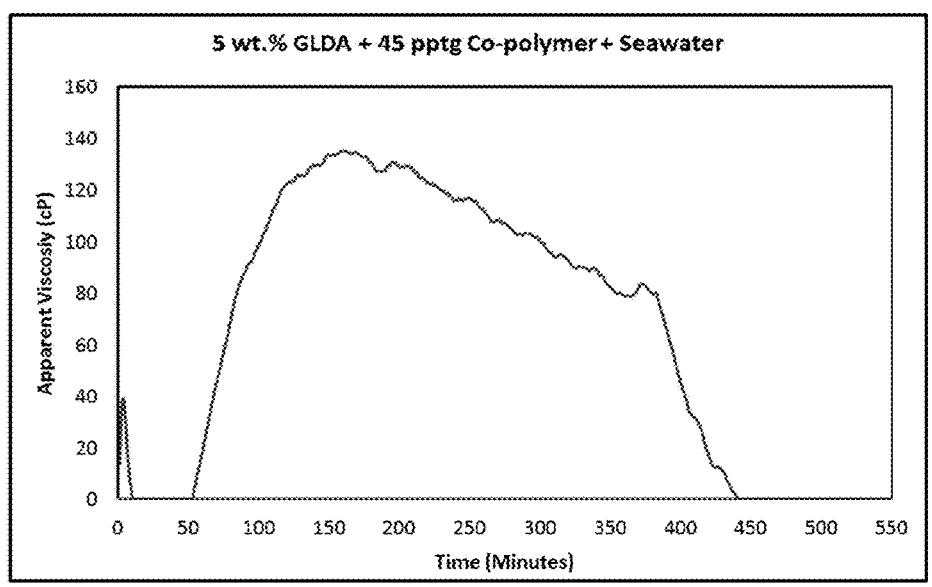
FIG. 4 represents a graph of viscosity versus time for a fracturing fluid composition having 5 wt % GLDA and 1 wt % polymeric additive (or about 45 pounds per thousand gallons, pptg) at a temperature of 300° F., a pressure of 300 psi, and a shear rate of 511 s$^{-1}$.
Figure 5:
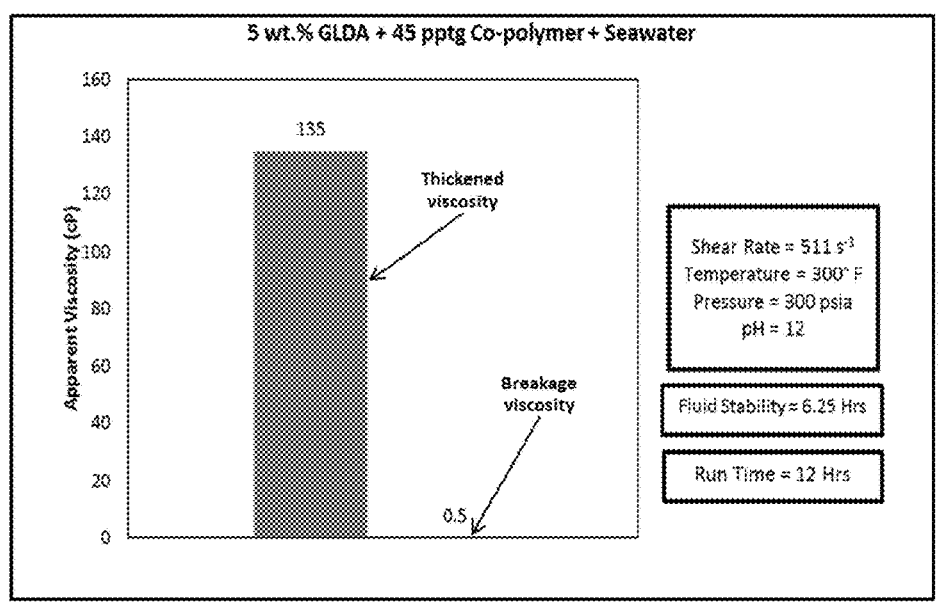
FIG. 5 represents an apparent thickened and breakage viscosity of a fracturing fluid composition having 5 wt % GLDA and 1 wt % polymeric additive (or about 45 pounds per thousand gallons, pptg) at a temperature of 300° F., a pressure of 300 psi, and a shear rate of 511 s$^{-1}$.

FIG. 4 and FIG. 5 show viscosity measurements of a second fracturing fluid composition that includes 5 wt % GLDA and 45 pptg co-polymer diluted in seawater at 300° F. and 300 psi. The viscosity increased to an average value of 135 lb/100 ft² and remained stable for more than 6 hours and then declined to 0.5. As a result, this fluid composition can be used for low permeability or unconventional reservoirs. The pH of the fluid was around 12.

Figure 6:
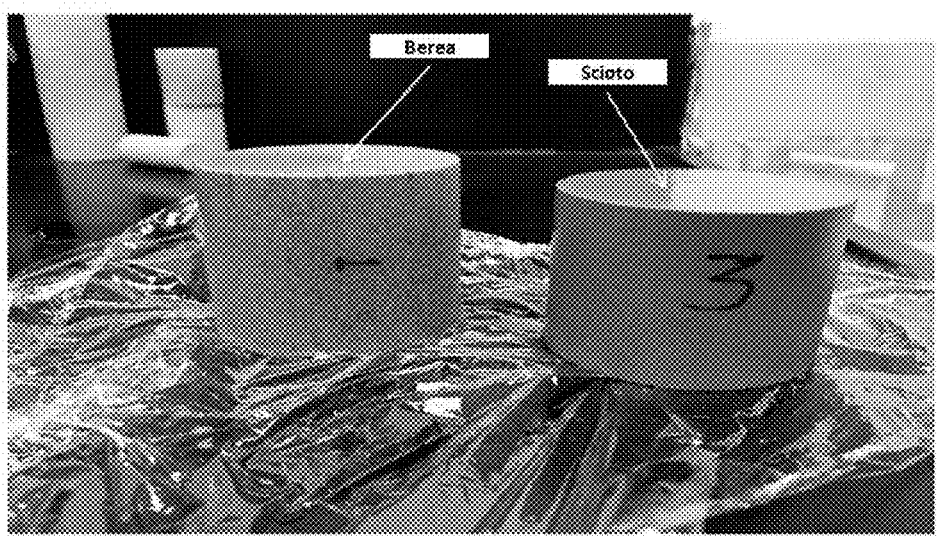
FIG. 6 represents a Berea and a Scioto sample used for a coreflooding experiment.

FIG. 6 shows the two coreflooding samples (Berea and Scioto sandstone cores) used in this study and the composition of each is listed in Table 3.

Example 3

Figure 7:
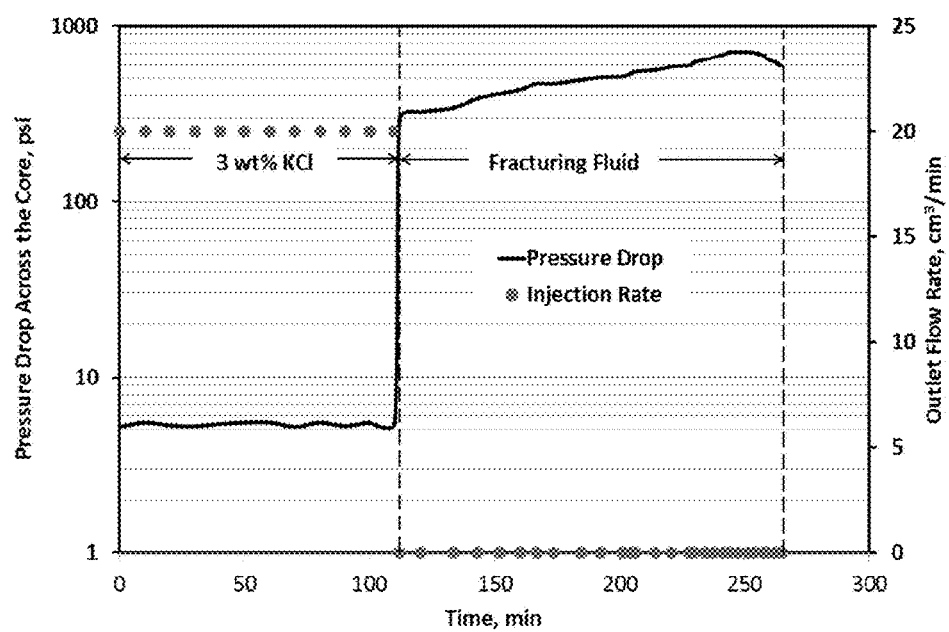
FIG. 7 represents a pressure drop of the fracturing fluid composition having 10 wt % GLDA and 1 wt % polymeric additive at a temperature of 300° F. and an injection rate of 20 cm$^3$/min, across the Berea coreflooding sample.
Figure 8:
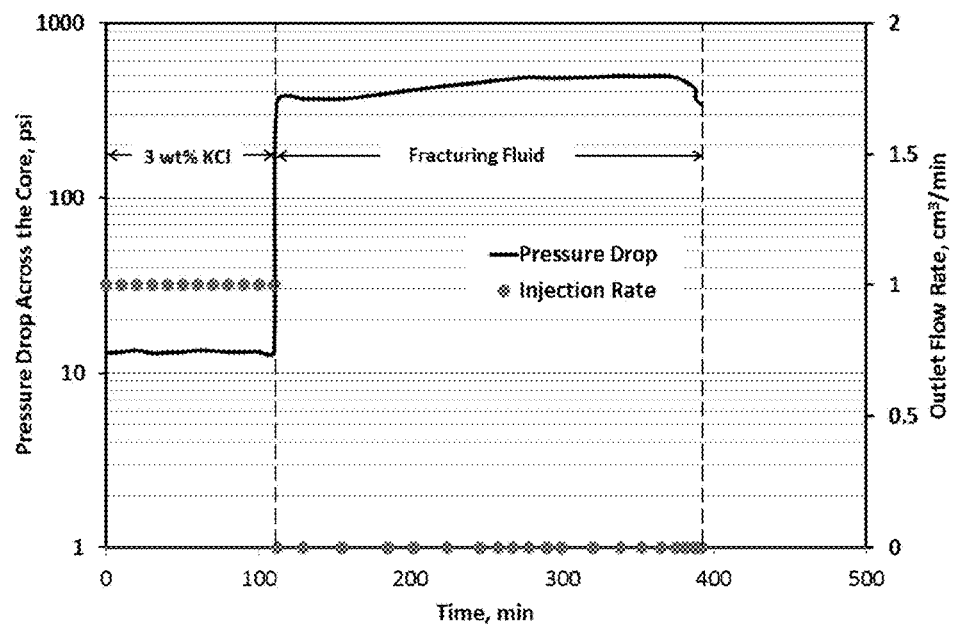
FIG. 8 represents a pressure drop of the fracturing fluid composition having 5 wt % GLDA and 1 wt % polymeric additive at a temperature of 300° F. and an injection rate of 20 cm$^3$/min, across the Scioto coreflooding sample.

FIG. 7 and FIG. 8 show the coreflooding behavior of the two experiments for the conventional and the unconventional coreflooding samples. FIG. 7 shows that the pressure elevated soon after GLDA/polymer solution was injected, and the outlet flow rate remained zero for more than two hours. After reaching a peak value, the pressure went down due to a breakage of the solution. The core permeability was observed to be 150 md before and after the experiment. As a result, the coreflooding did not damage to the formation, due to a zero fluid loss behavior of the treating fluid.

Similarly, FIG. 8 shows that the pressure went up after GLDA/polymer solution was injected, and the outlet flow rate remained zero for more than four hours. After reaching a peak value, the pressure went down due to a breakage of the solution. The core permeability was observed to be 3.2 md before and after the experiment, which implies no damage to the formation, due to a zero fluid loss behavior of the treating fluid.

Example 4

In a separate set of experiments, the rheological properties of multiple fracturing fluid compositions were obtained and listed in Tables 4 and 5.

TABLE 4

Composition and physical properties of the fracturing fluids used in this study.

| # | Base fluid | Chelating agent | Chelating agent concentration (wt. %) | Polymer additive | Polymer additive concentration (pptg) | Temperature (° F.) | Pressure (Psia) | pH |
| --- | --- | --- | --- | --- | --- | --- | --- | --- |
| 1 | Seawater | GLDA | 20 | AMPS | 20 (0.239 g) | 300 | 300 | 12 |
| 2 | Seawater | GLDA | 20 | HPAM | 20 (0.239 g) | 300 | 300 | 12 |
| 3 | Seawater | GLDA | 20 | TVP | 20 (0.239 g) | 300 | 300 | 12 |
| 4 | Seawater | GLDA | 20 | AMPS | 45 (0.539 g) | 300 | 300 | 12 |
| 5 | Seawater | GLDA | 20 | HPAM | 45 (0.539 g) | 300 | 300 | 12 |
| 6 | Seawater | GLDA | 20 | TVP | 45 (0.539 g) | 300 | 300 | 12 |

In addition, average gel strength of the above fluid compositions after 10 seconds was found to be in the range of 7 to 11 lb/100 ft², whereas this quantity was found to be in the range of 15 to 19 lb/100 ft² after 10 minutes.

TABLE 5 rheological properties of the fracturing fluids used in this study.

| # | Reading at 600 rpm | Reading at 300 rpm | Plastic viscosity (cP) | Yield point (lb/100 ft²) | Gel strength after 10 sec. (lb/100 ft²) | Gel strength after 10 min. (lb/100 ft²) |
| --- | --- | --- | --- | --- | --- | --- |
| 1 | 17 | 13 | 7 | 6 | 7 to 11 | 15 to 19 |
| 2 | 10 | 7 | 3 | 4 | 7 to 11 | 15 to 19 |
| 3 | 6 | 4 | 2 | 2 | 7 to 11 | 15 to 19 |
| 4 | 103 | 73 | 29 | 44 | 7 to 11 | 15 to 19 |
| 5 | 45 | 32 | 13 | 19 | 7 to 11 | 15 to 19 |
| 6 | 25 | 17 | 8 | 9 | 7 to 11 | 15 to 19 |

The invention claimed is:
1. An organic acid fracturing fluid composition, comprising:
   an aqueous base fluid;
   a chelating agent comprising glutamic diacetic acid in an amount of 5-20 wt %, wherein wt % is relative to the total weight of the fracturing fluid composition; and
   a polymeric additive comprising a copolymer of acrylamido-tert-butyl sulfonate and partially hydrolyzed polyacrylamide, in an amount of 0.45-1 wt %, wherein wt % is relative to the total weight of the fracturing fluid composition, wherein the polymeric additive is present in the fracturing fluid composition at a concentration of no more than 1 wt % relative to the total weight of the fracturing fluid composition;

wherein a weight percent of acrylamido-tert-butyl sulfonate in the copolymer is in the range of 5 to 20 wt %, and a weight percent of the partially hydrolyzed polyacrylamide in the copolymer is in the range of 80 to 95 wt %, each relative to the total weight of the copolymer.

2. The fracturing fluid composition of claim 1, wherein the aqueous base fluid is seawater.

3. The fracturing fluid composition of claim 1, which does not include, other than the chelating agent and the polymeric additive, additional additives selected from the group consisting of an antiscalant, a deflocculant, a crosslinker, a breaker, a fluid loss additive, a buffer, an interfacial tension reducer, and a biocide.

4. The fracturing fluid composition of claim 1, which has a plastic viscosity of 2 to 8 cP at a temperature of 280 to 320° F.

5. The fracturing fluid composition of claim 1, which has a yield point of 2 to 15 lb/100 ft$^2$ at a temperature of 280 to 320° F.

* * * * *